(12) United States Patent
Banerjee et al.

(10) Patent No.: US 7,922,094 B2
(45) Date of Patent: *Apr. 12, 2011

(54) RFID PACKAGING AND ATTACHMENT METHODS AND DEVICES

(75) Inventors: Swagata R. Banerjee, North Oaks, MN (US); Jacob D. Chatterton, St. Paul, MN (US); Justin M. Johnson, Oakdale, MN (US); Michael C. Molinet, Woodbury, MN (US); Robert A. Sainati, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 170 days.

This patent is subject to a terminal disclaimer.

(21) Appl. No.: 12/351,590

(22) Filed: Jan. 9, 2009

(65) Prior Publication Data
US 2010/0176971 A1 Jul. 15, 2010

(51) Int. Cl.
*G06K 19/06* (2006.01)

(52) U.S. Cl. ....... 235/492; 235/375; 235/380; 340/5.61; 340/10.1; 340/472.7; 340/928

(58) Field of Classification Search .................. 235/492, 235/375, 380; 340/5.61, 10.1, 472.7, 928
See application file for complete search history.

(56) References Cited

U.S. PATENT DOCUMENTS

| | | | |
|---|---|---|---|
| 5,493,291 A * | 2/1996 | Bruggemann | ............... 340/905 |
| 6,265,977 B1 | 7/2001 | Vega et al. | |
| 6,371,380 B1 | 4/2002 | Tanimura | |
| 6,999,028 B2 | 2/2006 | Egbert | |
| 7,055,754 B2 | 6/2006 | Forster | |
| 7,298,330 B2 | 11/2007 | Forster et al. | |
| 2005/0093678 A1 | 5/2005 | Forster et al. | |
| 2006/0261950 A1 | 11/2006 | Arneson et al. | |
| 2007/0008140 A1* | 1/2007 | Saarisalo et al. | ........... 340/572.7 |
| 2007/0017986 A1 | 1/2007 | Carrender et al. | |
| 2008/0258875 A1 | 10/2008 | Jesme et al. | |

FOREIGN PATENT DOCUMENTS

| | | |
|---|---|---|
| DE | 29822146 | 3/1999 |
| KR | 10-2002-0075100 | 10/2002 |
| WO | WO 96/35196 | 11/1996 |

(Continued)

OTHER PUBLICATIONS

Arnold Magnetic Technologies Corporation, Soft Magnetics Application Guide, pp. 30-31, Rev. B, (Feb. 2003).

(Continued)

*Primary Examiner* — Allyson N Trail (57) ABSTRACT

One exemplary electrically conductive, RFID-enabled signage includes (1) an electrically conductive article including an opening and (2) an assembled device that is coupled to the electrically conductive article to provide RFID functionality to the electrically conductive article. One exemplary kit includes (1) an RFID IC arrangement including conductive leads adjacent to an integrated circuit; (2) an insert attached to the RFID IC arrangement; and (3) an attachment device capable of attaching the RFID IC arrangement-insert combination to an electrically conductive signage such that the RFID IC arrangement is positioned to span at least a portion of an opening in the signage and to electrically couple the integrated circuit to the electrically conductive signage. One exemplary method involves providing an assembled device including and RFID IC arrangement and an insert and coupling the assembled device with an electrically conductive signage.

26 Claims, 3 Drawing Sheets

FOREIGN PATENT DOCUMENTS

| | | |
|---|---|---|
| WO | WO 03/030093 | 4/2003 |
| WO | WO 03/067512 | 8/2003 |

OTHER PUBLICATIONS

K. Finkenzeller, RFID Handbook, Radio-Frequency Identification Fundamentals and Applications, pp. 21, 64 (1999).

John C. Slater and Nathaniel H. Frank, Electromagnetism, pp. 78-80 (1969).

B.T. Stephenson and C.H. Walter, Endfire Slot Antennas, Ire Transactions—Antennas and Propagation, pp. 81-86, (1956).

L. Ukkonen, M. Schaffrath, L. Sydänheimo, M. Kivikoshi, *Analysis of Integrated Slot-Type Tag Antennas for Passive UHF RFID*, IEEE, (Feb. 2006).

* cited by examiner

RFID PACKAGING AND ATTACHMENT METHODS AND DEVICES

TECHNICAL FIELD

The present disclosure relates to multiple embodiments of a signage article having radio-frequency responsive features, methods of making and using the signage article, and replacement kits.

BACKGROUND

Radio frequency identification technology, sometimes referred to as RFID technology, has a variety of commercial applications, and is typically used for object identification and tracking.

U.S. Patent Publication No. 2008-0258875 (U.S. patent application Ser. No. 12/106,107 assigned to the assignee of the present application) describes various methods of coupling RFID functionality to a signage, such as, for example, a metal sign, so that the signage can be associated with data stored in the RFID integrated circuit that is affixed to or integrated with the metal sign. One such method involves attaching or coupling RFID functionality to a signage by forming a slot, opening, or aperture in the signage and using that slot, opening, or aperture to act as an antenna for an RFID integrated circuit that is physically coupled to the signage. This cutout, opening, or aperture creates what can be referred to as a "slot antenna," which has radiation pattern properties similar to that of a dipole antenna. The selection of the length and width of the slot, opening, or aperture can be based on a desired radiation direction and/or pattern of the electrically conductive, RFID-enabled signage article that is formed when the RFID integrated circuit is coupled with the electrically conductive element.

U.S. Patent Publication No. 2008-0258875 also describes various apparatuses having RFID functionality. One such apparatus is an electrically conductive, RFID-enabled signage article including a slot antenna having an electrically conductive element including an opening; and an RFID integrated circuit coupled to the substrate. The slot antenna operates as an RFID antenna, and the electrically conductive element includes at least one of an electrically conductive substrate or electrically conductive sheeting.

SUMMARY

The inventors of the present disclosure recognized the many advantages offered by the methods and apparatuses described in U.S. Patent Publication No. 2008-0258875. This disclosure describes additional features and devices that may be used with, for example, the apparatuses described in U.S. Patent Publication No. 2008-0258875. This disclosure also describes additional or alternative methods of making and using RFID-enabled apparatuses. The present disclosure relates to numerous embodiments and numerous implementations of each embodiment.

One embodiment is an electrically conductive, RFID-enabled signage, comprising an electrically conductive article including an opening and at least one of an electrically conductive substrate or electrically conductive sheeting and an assembled device capable of being physically coupled to the electrically conductive article to provide RFID functionality to the electrically conductive article. The assembled device includes (1) an RFID IC arrangement comprising an integrated circuit adjacent to conductive leads and (2) an insert having a shape and size that permits the insert to fit within the opening. The assembled device is physically coupled to the electrically conductive article such that the RFID IC arrangement spans at least a portion of the opening and electrically couples the integrated circuit to the electrically conductive article to drive a slot antenna.

Another embodiment is an electrically conductive, RFID-enabled signage including (1) an electrically conductive article including an opening and at least one of an electrically conductive substrate or electrically conductive sheeting and (2) an assembled device capable of being physically coupled to the electrically conductive article to provide RFID functionality to the electrically conductive article. The assembled device includes an RFID IC arrangement comprising an integrated circuit adjacent to conductive leads. The RFID IC arrangement is commonly referred to as a strap or interposer. The IC arrangement is attached to an insert having a shape and size that permits the insert to fit within the opening. When the assembled device is physically coupled to the electrically conductive article, the RFID IC arrangement spans at least a portion of the opening and electrically couples the integrated circuit to the electrically conductive article to drive a slot antenna. In some implementations of this embodiment, the strap can include at least one capacitive pad.

In some embodiments, at least one of the electrically conductive article and the assembled device include an alignment feature that facilitates accurate alignment of the electrically conductive article and the assembled device. One exemplary alignment feature comprises the opening having a predetermined shape; and the shape of the insert corresponding to the predetermined shape of the opening such that the insert fits within the opening to facilitate accurate alignment of the electrically conductive article and the assembled device. Another exemplary alignment feature comprises instructions printed on at least one of the electrically conductive article and the assembled device to facilitate accurate alignment of the assembled device and the electrically conductive article.

In some embodiments, the assembled device further includes an adhesive material having an adhesive surface and a non-adhesive surface, at least a portion of the adhesive surface in direct physical contact with at least one of the RFID IC arrangement and the insert and the remaining portion of the adhesive surface capable of attachment to the electrically conductive article. At least a portion of the adhesive is preferably conductive. The adhesive material may include a release liner that facilitates attachment of the adhesive material to one or more of the RFID IC arrangement, the insert, or the electrically conductive article.

Another embodiment of the present disclosure is an assembled device capable of being physically coupled to an electrically conductive article including an opening. The assembled device is capable of providing RFID functionality to the electrically conductive article such that the article becomes an electrically conductive, RFID-enabled signage. The assembled device includes (1) an RFID IC arrangement or strap including an integrated circuit adjacent to conductive leads; (2) an insert having a shape and size that permits it to fit within the opening; and (3) an attachment device capable of attaching the RFID IC arrangement-insert combination to the electrically conductive article such that the RFID IC arrangement is positioned to span at least a portion of the opening and to electrically couple the integrated circuit to the electrically conductive article to drive a slot antenna. One exemplary attachment device is a protective layer with an adhesive layer.

In some embodiments, at least one of the electrically conductive article or the assembled device includes an alignment feature that facilitates accurate alignment of the electrically conductive article and the assembled device. One exemplary alignment feature comprises the opening having a predetermined shape; and the shape of the insert corresponding to the predetermined shape of the opening such that the insert fits within the opening to facilitate accurate alignment of the electrically conductive article and the assembled device. Another exemplary alignment feature comprises instructions printed on at least one of the electrically conductive article and the assembled device to facilitate accurate alignment of the assembled device and the electrically conductive article.

Another embodiment of the present disclosure is a kit comprising (1) an RFID IC arrangement including an integrated circuit adjacent to conductive leads; (2) an insert capable of attachment to the RFID IC arrangement; and (3) an attachment device capable of attaching the RFID IC arrangement-insert combination to an electrically conductive signage such that the RFID IC arrangement is positioned to span at least a portion of an opening in the signage and to electrically couple the integrated circuit to the electrically conductive signage to drive a slot antenna.

Another embodiment of the present disclosure is a method of forming an RFID-enabled electrically conductive signage comprising: (1) providing an electrically conductive signage including an opening and at least one of an electrically conductive substrate or an electrically conductive sheeting; (2) providing an assembled device including (a) an RFID IC arrangement or strap including conductive leads adjacent to an integrated circuit; and (b) an insert having a shape and size that permits the insert to fit within the opening; and (3) inserting the assembled device into the opening of the electrically conductive signage in a position that provides RFID functionality to the electrically conductive article.

BRIEF DESCRIPTION OF DRAWINGS

FIG. 1b and 1c are exploded top views of two alternative embodiments of the RFID-enabled traffic signage article of FIG. 1a.

DETAILED DESCRIPTION

Figure 1A:
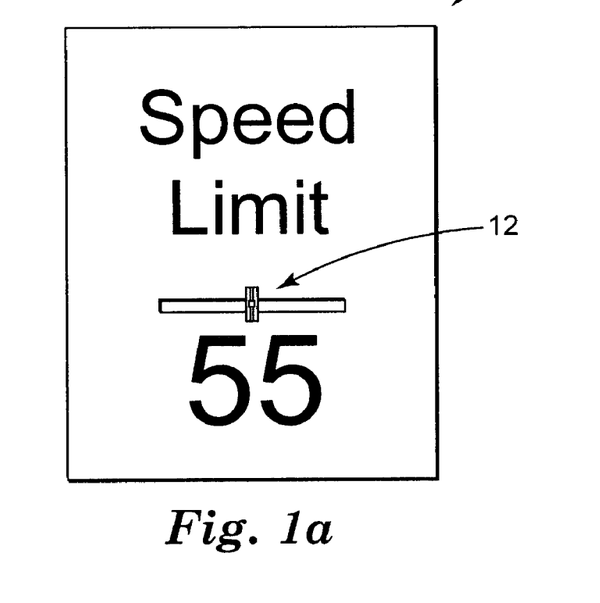
FIG. 1a is a top view schematic of one embodiment of an RFID-enabled traffic signage article.
Figure 1B:
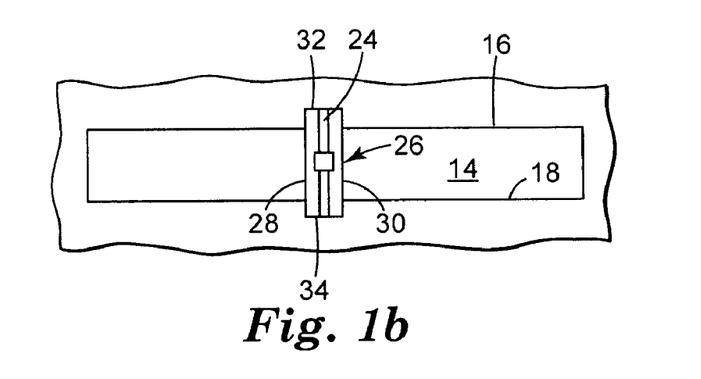
Figure 1C:
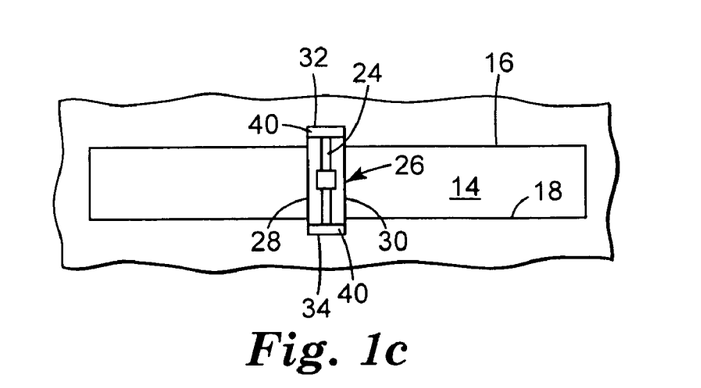
Figure 2:
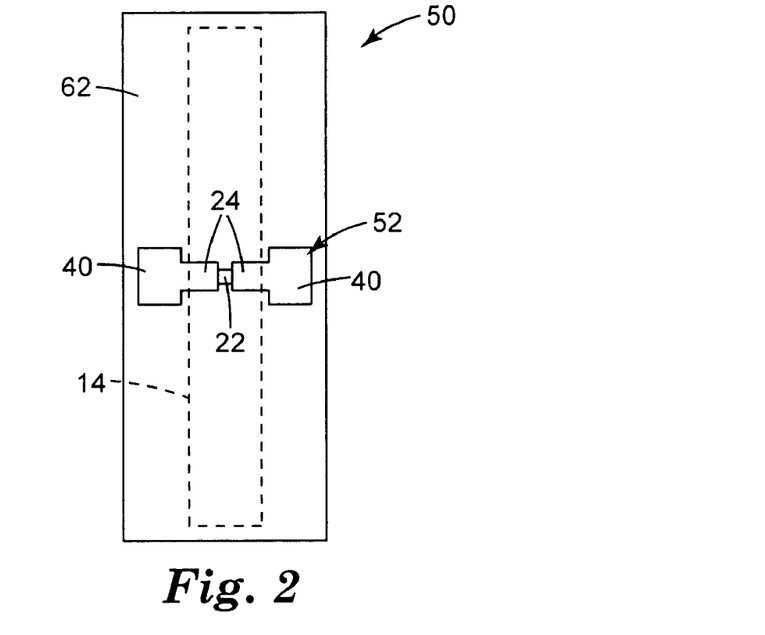
FIG. 2 is a top view schematic of an assembled device for capacitively coupling an RFID integrated circuit to a signage including an aperture.
Figure 3:
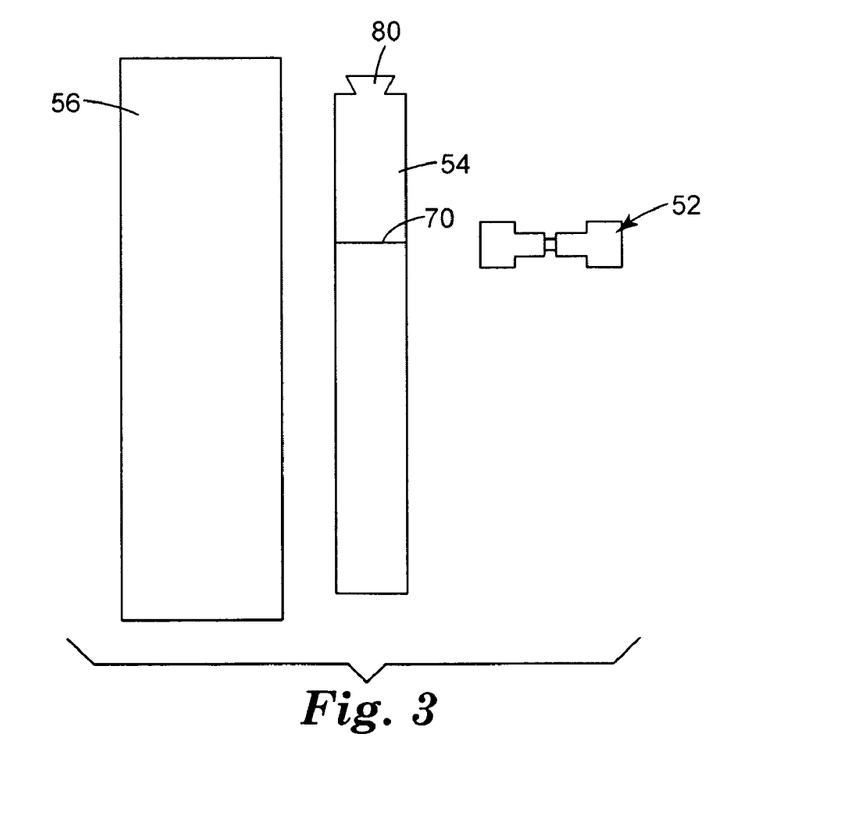
FIG. 3 is a top view schematic of each piece of one exemplary assembled device.
Figure 4:
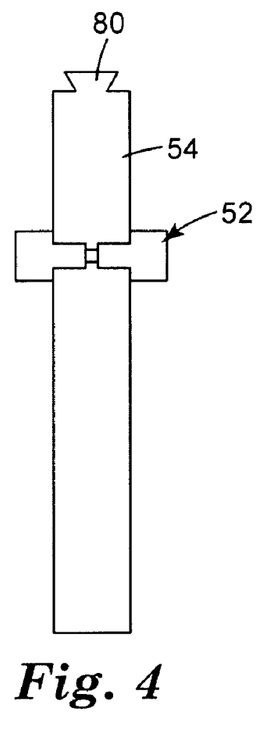
FIG. 4 is a top view schematic of one exemplary RFID IC arrangement-insert combination coupled together.
Figure 5:
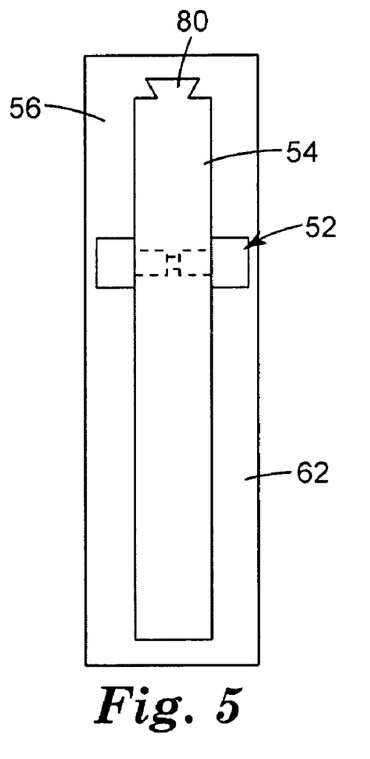
FIG. 5 is a top view schematic of the RFID-IC arrangement-insert combination of FIG. 4 coupled to a protective layer.

FIG. 1a is a top view schematic of a metal speed limit sign 10 including a radio frequency-responsive element 12. FIGS. 1b and 1c are exploded views of two alternative embodiments of the portion of sign 10 including radio frequency-responsive element 12. In FIG. 1b, sign 10 includes a rectangular cutout, opening, or aperture 14 having a first side 16 and a second side 18. Aperture 14 is made in a major surface of a substrate. An integrated circuit 22 (or chip) is attached to a conductive lead 24, this is commonly referred to as a strap 26 or an interposer. Integrated circuit 22 is electrically coupled to the conductive leads of the RFID strap 26. The conductive leads are in turn coupled to the electrically conductive signage. The conductive leads may be parts of a unitary, continuous layer of conductive material forming the antenna structure or may be separate parts.

Strap 26 is attached to sign 10 such that strap 26 is positioned across a horizontal axis of aperture 14 such that the RFID integrated circuit 22 is positioned within or adjacent to aperture 14. Strap 26 may have an electrically direct contact to the conductive signage or may be capacitively coupled to the signage. The conductive leads of strap 26 are preferably flexible and may provide electrical and/or physical connection of the RFID integrated circuit to the signage. Consequently, strap 26 electrically (and may physically) ties the metal or conductive portion of sign 10 to the RFID integrated circuit 22. Because strap 26 can be placed directly across aperture 14 and aperture 14 acts as a slot antenna, provision of a separate antenna may not be required in some embodiments.

In some embodiments, strap 26 also may include a substrate to support the RFID integrated circuit and/or the conductive leads. In another possible variation, the RFID integrated circuit and the conductive leads may be supported by a separate substrate for processing purposes, and this separate substrate may remain with the integrated circuit and leads after the integrated circuit and leads are coupled to the antenna, or may be removed. Strap 26 may include conductive leads of any shape and size, including, for example, arms of the types described in, for example, U.S. Pat. No. 7,298,330.

In FIG. 1c, the conductive leads of strap 26 include two capacitive pads 40 on either terminal end of strap 26. Capacitive pads 40 provide an additional tuning element for the antenna design, which may improve the overall performance and read-range of the RFID-enabled signage. Since there is no matching network of discrete components for the IC, the aperture antenna itself must be designed to provide a conjugate match. This is typically accomplished by appropriate choice of the aperture size and feed point (the position at which an integrated circuit is electrically coupled to the antenna). However, changing the aperture size and feed point can affect both the real and imaginary part of the impedance. Because the aperture antennas designed for signage are typically highly inductive, the capacitive pads can be used to lower this inductance without affecting the real part of the aperture impedance.

The preferred size of the capacitive pads can be determined by using the parallel plate approximation because the spacing between the pads and the signage is relatively small. Thus $$C = \acute{\in} * A/d$$

Where $\acute{\in}$ is the dielectric permittivity, C is the capacitance of the capacitive pad, A is the area of the capacitive pad, and d is the distance between the capacitive pad and the sign.

In both embodiments shown in FIGS. 1b and 1c, an RFID reader (not shown) induces signals across the aperture which the strap routes to the RFID integrated circuit. It is important that there be no additional metal inside or covering the aperture. So, non-metallic reflective or other dielectric material sheeting could be used in this area, such as, for example, Diamond Grade™ reflective sheeting manufactured by 3M Company of St. Paul, Minn. Alternatively, a companion aperture could be cut into metallic reflective sheeting.

In some preferred implementations, strap 26 is relatively flush with sign 10 (see, for example, FIG. 6) such that RFID integrated circuit 22 sits within the aperture 14. This facilitates the stacking of multiple signs on top of one another without causing injury or damage to the RFID integrated circuit attached to or associated with the sign. In some embodiments, strap 26 has a minimal thickness, for example, a thickness between about 0.5 mil and about 5 mils.

Those of skill in the art will appreciate that many changes can be made to the embodiment shown in FIGS. 1b and 1c without departing from the spirit of the concept. For example, although strap 26 is shown as attached to the front face of sign 10 in FIGS. 1a, 1b, and 1c, strap 26 can also be attached to the rear face of sign 10 (not shown) or within the thickness of sign 10. Also, aperture 14 need not be rectangular in shape; aperture 14 can be of any desirable shape (e.g., tapered slots and annular rings) and can be placed in any desirable location on sign 10 including the use of multiple slots or arrays of slots. Additionally, the signage may include an array of apertures, which may increase the antenna directivity and the read-range as well as modify the radiation pattern. Further, sign 10 need not be a rectangular speed limit sign, but can be any shape or form of signage. Additionally, strap 26 can be shaped differently (e.g., wider, shorter, longer, thinner, with arms as described in, for example, U.S. Pat. No. 7,298,330) than shown in FIGS. 1a, 1b, and 1c.

The present application also relates to various devices, kits (once assembled), and methods for affecting convenient and/or accurate attachment and alignment of an RFID IC to a signage (including, for example, an electrically conductive signage) having an aperture or opening of the type described, for example, in U.S. Patent Publication No. 2008-0258875.

At least some preferred embodiments relate to an assembled device or kit (once assembled) that can be attached to a signage to create an RFID-enabled signage. One embodiment of this assembled device 50 is shown in FIGS. 2-5. Assembled device 50 includes (1) a strap 26 or interposer that includes an integrated circuit 22 or chip; (2) conductive leads 24 extending from the integrated circuit 22 or chip; and (3) capacitive pads 40. This portion of the assembled device will be referred to as the IC arrangement 52. IC arrangement 52 is coupled to an insert 54 that is preferably of a shape and size to fit within aperture 14 of sign 10. A protective layer 56 including an adhesive layer coated onto a generally planar material is placed on top of insert 54 and IC arrangement 52 such that the adhesive layer is in physical contact with at least a portion of insert 54 and/or at least a portion of IC arrangement 52. Some exemplary preferred adhesives include, but are not limited to, those that can bond to metals, high and low surface energy materials, textures and contoured surfaces, powder coatings, and slightly oily metals and those that are resistant to harsh environments.

Protective layer 56 helps to protect the RFID IC from the environment and other physical strains, which can be especially useful when the signage is outdoor signage. The length and width of protective layer 56 is preferably greater than the length and width of insert 54 and of aperture 14 so that protective layer 56 may be placed directly adjacent to sign 10 such that the adhesive layer is in direct physical contact with a surface of sign 10. In this way, protective layer 56 affixes insert 54 and IC arrangement 52 to sign 10.

Insert 54 can be formed of any suitable material, but is preferably a non-interfering, non-conductive material such as, for example, plastic. Exemplary plastics include, for example, ABS, acetal, acrylic, fluoropolymers, nylon, polycarbonate, polyester, polyetherimide, polyethylene, polypropylene, and polystyrene. Insert 54 is preferably sufficiently firm to resist permanent deformation when light compressive force is applied thereto. This firmness helps to maintain the shape of the RFID integrated circuit and/or the sheeting material on the signage (if present). In some exemplary embodiments, insert 54 is formed of a material having a firmness of at least 5 PSI where firmness is measured by compression force (% deflection), which is the amount of pressure required to compress foam to a given percentage of its thickness (the higher the psi value, the higher the firmness).

Figure 7:
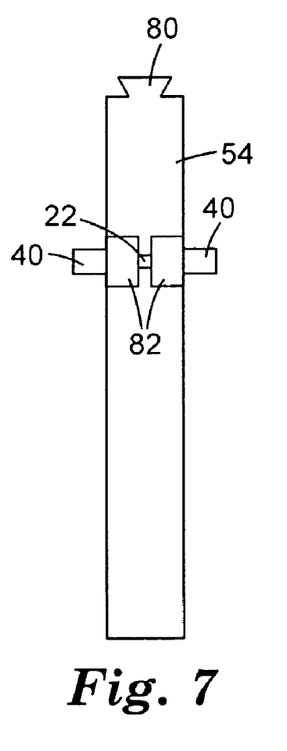
FIG. 7 is a top view schematic showing an alternative embodiment of an insert.

An alternative insert is shown in FIG. 7 and includes a single-side copper clad PC board as the insert. Common PC board materials include, for example, FR4 or Rogers Duroid substrates. The process of making this embodiment would include the following steps: (1) purchasing a single side copper clad PC board; (2) etching or milling one or more traces 82 onto the insert/PC board to create the interconnect (etching or milling involves removing at least some of the copper); (3) cutting the insert/PC board to the desired shape and size; and (4) attaching the integrated circuit chip thereto. Optionally, copper tabs, wirebonds, or the like can be used to create capacitive pads 40. Those of skill in the art will appreciate that this alternative embodiment, or components or methods thereof, can be used in connection with previously discussed embodiments.

Figure 6:
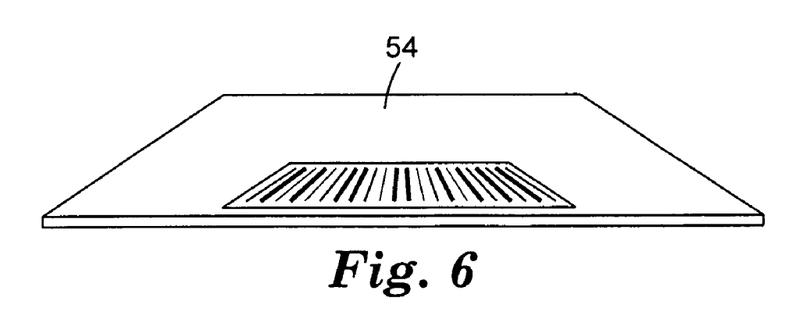
FIG. 6 is a side view schematic showing one exemplary assembled device attached to a metal signage.

In some implementations, protective layer 56 may also include identifying information. For example, a bar code could be printed onto adhesive material, as is shown in FIG. 6. Such identifying information could be printed by, for example, thermal printing, ink jet printing, flexography, hot stamping, letterpressing, thermal transfer printing, and screen printing. Where ink jet printing methods are used, resin ribbons may be preferred for optimal durability.

RFID IC arrangement and insert preferably sit within aperture 14 so that RFID integrated circuit 22 does not extend appreciably above either major surface of signage 10, as is shown in FIG. 6.

The aperture antennas designed for use with electrically conductive signage are often highly tuned to ensure optimal performance, so changing the feed point(s) will affect both the real and imaginary part of the impedance. Consequently, it is important to ensure that the feed points are correctly or accurately positioned. Because the assembly described above has three separate parts that are coupled together (the IC arrangement, the insert, and the protective layer), and because each of the three parts has a bearing on correct positioning of the integrated circuit, two positioning processes are of importance when using the above-described assembly: (1) positioning the IC arrangement on/adjacent to the insert; and (2) positioning the insert within/on the aperture.

Regarding the stop of positioning the IC arrangement on/adjacent to the insert, some preferred implementations may include a strap placement feature that assists in accurate alignment of the IC arrangement on the insert. One exemplary strap placement feature 70 (shown in FIG. 3) is a mark on insert 54 that denotes the preferred placement of IC arrangement 52. In this implementation, IC arrangement 52 can be aligned with insert 54 by aligning strap 26 with a mark on insert 54 (FIG. 4), and then placing the insert/IC arrangement combination adjacent to the protective layer or label material (FIG. 5) to form an assembled device having the necessary impedance match to the integrated circuit. The IC arrangement, insert, and attachment device (e.g. a protective layer including an adhesive material) can be manufactured in a roll-to-roll process and can be sold as an assembled device. The assembled devices described herein may be attached or affixed to the electrically conductive signage when the signage is manufactured/assembled or may be applied at a point later in the signage's life.

As is shown and described in detail in U.S. Patent Publication No. 2008-0258875, strap 26 includes a first major side, a second major side, a first minor side, and a second minor side. When strap 26 is positioned adjacent to signage 10, the first minor side of strap 26 is positioned adjacent to the top major surface of aperture 14, and the second minor side of strap 26 is positioned adjacent to the bottom major surface of aperture 14. Consequently, strap 26 is attached to signage 10 such that strap 26 is positioned across a horizontal axis of aperture 14 and such that the RFID integrated circuit 22 is positioned within or adjacent to aperture 14. Strap 26 may have an electrically direct contact to the conductive signage, or may be capacitively coupled to the signage. Strap 26 is preferably a flexible substrate that provides electrical (and potentially physical) connection of the RFID integrated circuit to the signage. Consequently, strap 26 electrically (and may physically) ties the metal of sign 10 to the RFID integrated circuit 22. Because strap 26 can be placed directly across aperture 14, and aperture 14 acts as a slot antenna, a separate antenna may not be required in some embodiments. Any appropriate commercially available RFID integrated circuit may be used in connection with the embodiments of the present application. The integrated circuit can be purchased prepackaged or manufactured. Exemplary commercially integrated circuits include those sold by NXP of the Netherlands.

Regarding the step of positioning the insert within/on the aperture, some preferred implementations include an alignment feature that assists the user in aligning the insert and the aperture to ensure that the RFID IC arrangement/insert combination is installed in the correct location and makes the necessary electrical contact with the signage. One exemplary alignment feature is an instruction or identifying feature (e.g., text or symbols guiding the user to correctly align the parts) formed on one of the insert or the signage that promotes correct alignment of the IC arrangement/insert combination within the aperture. For example, the insert could have an arrow printed on it that directs the user how to correctly couple the parts and thus to ensure correct orientation during installation.

Another exemplary alignment feature is forming an insert having a predetermined shape and size that fits into a specifically shaped and sized aperture to ensure that the pieces are oriented correctly. One exemplary unique shape is shown, for example, in FIGS. 3-5 in which insert 54 has a notch 80 at one of its terminal ends. The aperture into which this insert would be placed would have a corresponding shape that would facilitate correct insertion and alignment of the insert within the aperture. Some preferred alignment features allow the insert to be physically coupled with the aperture in only one way.

Signage 10 may include as its substrate an electrically conductive material or a nonconductive material. Exemplary electrically conductive materials include, for example, a metal plate, such as, for example, an aluminum plate. Exemplary nonconductive materials include, for example, wood or plastic. Where the signage substrate comprises a nonconductive material, electrical conductivity of the complete electrically conductive, RFID-enabled signage article may come from, for example, an electrically conductive sheeting placed on at least a portion of the signage article, such as, for example, metallized retroreflective sheeting. For purposes of this application, sheeting with a metal (e.g., aluminum) vapor coat is considered conductive, although the level of conductivity may be minimal. Exemplary metalized sheetings include, for example, the following commercially available products the 3290T series of sheeting products; the CW80 series of sheeting products; high intensity beaded sheeting, such as, for example, the 3870 series of sheeting products; flexible high intensity sheeting, such as, for example, the 3810 series, the 3840, and the 31x barricade sheeting products; and license plate or validation sheeting, all of which are sold by 3M Company of St. Paul, Minn. Additionally, any prismatic sheeting products including a vapor coat would be considered conductive sheeting, such as, for example, the 985 conspicuity sheeting sold by 3M Company. Exemplary nonconductive sheeting products include, but are not limited to, prismatic sheeting products that are not vapor coated such as, for example, the HIP™ 3930 series, DG³™ 4000 series, VIP™ 3900 series, conspicuity 983 series, 3910 series CWZ™ prismatic, and rollup signs RS20 and RS30 series, all sold by 3M Company.

Those of skill in the art will appreciate that the use of protective layer 56 is merely one exemplary method of attaching the RFID arrangement and/or the insert to a signage.

The assembled devices described above can be sold preassembled or as separate parts (in a kit) that are put together by the user. In the latter implementation, the kit may include instructions as to preferred way(s) of assembling the separate parts to form the assembled device.

Another embodiment of the present disclosure is a method of forming an RFID-enabled electrically conductive signage. One exemplary method includes the following steps. The first step involves providing an electrically conductive signage including an opening. The signage can be electrically conductive due to one or more of the presence of an electrically conductive substrate or electrically conductive sheeting. The second step involves providing an assembled device that includes (a) an RFID IC arrangement or strap including conductive leads adjacent or coupled to an integrated circuit; and (b) an insert having a shape and size that permits the insert to fit within the opening in the electrically conductive signage. The assembled device or kit (when assembled) can be of any of the types described in the numerous embodiments and implementations above. The third step involves inserting the assembled device into the opening of the electrically conductive signage in a position that provides RFID functionality to the electrically conductive article. Additional optional steps include using an RFID reader to "read" information contained in the RFID integrated circuit; installing the RFID-enabled sign in the desired location; and replacing the assembled device by removing the assembled device from the signage and installing a new assembled device. Instructions may be provided as to preferred way(s) of joining the assembled device to electrically conductive signage.

The methods, devices, and kits of the present application have numerous advantages and benefits: (1) the devices described herein protects the RFID integrated circuit from the environment; (2) the devices and kits permit easy removal and replacement of the RFID integrated circuit without requiring removal of the sign; and (3) the alignment features and markings provides a means to align the feed points of the RFID integrated circuit in the proper place—even when performed by workers with little knowledge of or skill in the area of RFID technology.

Objects and advantages of the present application are further illustrated by the following examples, but the particular materials and amounts thereof recited in the examples, as well as other conditions and details, should not be construed to unduly limit the invention, as those of skill in the art will recognize that other parameters, materials, and equipment may be used.

EXAMPLE 1

An assembled device was formed as follows. A layer of topcoated facestock (3M #7868 Polyester Label Material, sold by 3M Company of St. Paul, Minn., which is a glossy, white polyester facestock label material) was obtained. Next, a barcode was printed onto the facestock using an ink jet printer. A layer of adhesive (#350 acrylic adhesive manufactured by 3M Company; 29 microns in thickness) was applied to the facestock. Using copper tape (EMI Copper Shielding Tape 1181 available from 3M Company), capacitive pads were formed that measured 12.7 mm by 12.7 mm with a 3 mm by 3 mm extension along one side. The capacitive pads were attached to an NXP Model G2XM IC available from NXP, Eindhoven, Netherlands by soldering the 3 mm by 3 mm extension on each capacitive pad to the 3 mm by 3 mm attach pad on each end of the strap of the NXP IC. The NXP IC with capacitive pads attached was then laid across the width of the insert at a position (a position that in construction of the assembled device would match the determined feed point position of a specific type of sign that the assembled device would be fitted into). The facestock with adhesive layer down was centered over the insert with the positioned NXP IC, resulting in the insert and NXP IC being adhered to the adhesive layer of the facestock layer.

The bottom (exposed) sides of the capacitive pads were lined with a non-conductive adhesive (3M Transfer Tape #467-MP, manufactured by 3M Company) to provide both the spacing and adhesion between the capacitive pads and the sign to create capacitive coupling between the two. This adhesive layer attaches the RFID strap to the sign.

Those having skill in the art will appreciate that many changes may be made to the details of the above-described embodiments without departing from the underlying principles thereof. The scope of the present application should, therefore, be determined only by the following claims.

What is claimed is:

1. An electrically conductive, RFID-enabled signage, comprising:
   an electrically conductive article including an opening and at least one of an electrically conductive substrate or an electrically conductive sheeting; and
   an assembled device capable of being physically coupled to the electrically conductive article to provide RFID functionality to the electrically conductive article, comprising:
      an RFID IC arrangement comprising conductive leads adjacent to an integrated circuit; and
      an insert having a shape and size that permits the insert to fit within the opening;
   wherein, the assembled device is physically coupled to the electrically conductive article such that the RFID IC arrangement spans at least a portion of the opening and electrically couples the integrated circuit to the electrically conductive article to drive a slot antenna.

2. The signage of claim 1, wherein at least one of the electrically conductive article and the assembled device include an alignment feature that facilitates accurate alignment of the electrically conductive article and the assembled device.

3. The signage of claim 2, wherein the alignment feature comprises:
   the opening having a predetermined shape; and
   the shape of the insert corresponding to the predetermined shape of the opening such that the insert fits within the opening to facilitate accurate alignment of the electrically conductive article and the assembled device.

4. The signage of claim 3, in which the assembled device further includes a protective layer having an adhesive surface and a non-adhesive surface, at least a portion of the adhesive surface in direct physical contact with at least one of the RFID IC arrangement and the insert and the remaining portion of the adhesive surface capable of attachment to the electrically conductive article.

5. The signage of claim 2, wherein the alignment feature comprises an instruction printed on at least one of the electrically conductive article or the assembled device to facilitate accurate alignment of the assembled device and the electrically conductive article.

6. The signage of claim 1, wherein the electrically conductive article includes an electrically conductive substrate positioned adjacent to at least one of conductive optically active sheeting or non-conductive optically active sheeting.

7. The signage of claim 1, wherein the electrically conductive article includes electrically conductive sheeting positioned adjacent to at least one of a non-conductive substrate and a conductive substrate.

8. The signage of claim 7, wherein the electrically conductive sheeting is optically active.

9. The signage of claim 1, wherein the signage comprises at least one of a traffic control material; a vehicle marking; a roadway marking; a roadway sign; a guard rail; a light pole; a license plate; a retroreflective garment; an indoor/outdoor labeling product; an identification tag; an identification label; or an identification system.

10. The signage of claim 1, wherein the opening is one slot in an array of slots.

11. The signage of claim 1, wherein the RFID integrated circuit stores information related to the signage.

12. The signage of claim 1, in which the assembled device further includes a protective layer having an adhesive surface and a non-adhesive surface, at least a portion of the adhesive surface in direct physical contact with at least one of the RFID IC arrangement and the insert and the remaining portion of the adhesive surface capable of attachment to the electrically conductive article.

13. The signage of claim 12, wherein at least a portion of the protective layer is conductive.

14. The signage of claim 1, in which the RFID IC arrangement further includes at least one capacitive pad.

15. An assembled device capable of being physically coupled to an electrically conductive article including an opening, the assembled device capable of providing RFID functionality to the electrically conductive article such that the article becomes an electrically conductive, RFID-enabled signage, the assembled device comprising:
   an RFID IC arrangement including conductive leads adjacent to an integrated circuit;
   an insert having a shape and size that permits it to fit within the opening, the insert attached to the RFID IC arrangement; and
   an attachment device capable of attaching the RFID IC arrangement-insert combination to the electrically conductive article such that the RFID IC arrangement is positioned to span at least a portion of the opening and to electrically couple the integrated circuit to the electrically conductive article.

16. The assembled device of claim 15, wherein the attachment device is a protective layer having an adhesive surface and a non-adhesive surface, at least a portion of the adhesive surface in direct physical contact with at least one of the RFID IC arrangement and the insert and the remaining portion of the adhesive surface capable of attachment to the electrically conductive article.

17. The assembled device of claim 16, wherein the adhesive material includes a first surface and an opposing second surface and wherein identification information is included on the first surface and at least a portion of the second surface includes a conductive adhesive.

18. The assembled device of claim 15, wherein at least one of the electrically conductive article and the RFID IC arrangement-insert combination includes an alignment feature that facilitates accurate alignment of the electrically conductive article and the RFID IC arrangement-insert combination.

19. The assembled device of claim 18, wherein the alignment feature comprises:
   the opening having a predetermined shape; and
   the shape of the insert corresponding to the predetermined shape of the opening such that the insert fits within the opening to facilitate accurate alignment of the electrically conductive article and the RFID IC arrangement-insert combination.

20. The assembled device of claim 18, wherein the alignment feature comprises instructions printed on at least one of the electrically conductive article and the RFID IC arrangement-insert combination to facilitate accurate alignment of the electrically conductive article and the RFID IC arrangement-insert combination.

21. The assembled device of claim 15, in which the RFID IC arrangement further includes at least one capacitive pad.

22. The assembled device of claim 15, wherein the electrically conductive, RFID-enabled signage comprises at least one of a traffic control material; a vehicle marking; a roadway marking; a roadway sign; a guard rail; a light pole; a license plate; a retroreflective garment; an indoor/outdoor labeling product; an identification tag; an identification label; or an identification system.

23. A kit, comprising:
   an RFID IC arrangement including conductive leads adjacent to an integrated circuit;
   an insert capable of attachment to the RFID IC arrangement; and
   an attachment device capable of attaching the RFID IC arrangement-insert combination to an electrically conductive signage such that the RFID IC arrangement is positioned to span at least a portion of an opening in the signage and to electrically couple the integrated circuit to the electrically conductive signage.

24. The kit of claim 23, further comprising instructions.

25. A method of forming an RFID-enabled electrically conductive signage, comprising:
   providing an electrically conductive signage including an opening and at least one of an electrically conductive substrate or an electrically conductive sheeting;
   providing an assembled device including:
      an RFID IC arrangement comprising conductive leads adjacent to an integrated circuit; and
      an insert having a shape and size that permits the insert to fit within the opening; and
   inserting the assembled device into the opening of the electrically conductive signage in a position that provides RFID functionality to the electrically conductive article.

26. The method of claim 25, in which the inserting step involves positioning the RFID IC arrangement to span at least a portion of the opening and to electrically couple the integrated circuit to the electrically conductive article.

* * * * *

UNITED STATES PATENT AND TRADEMARK OFFICE
CERTIFICATE OF CORRECTION

PATENT NO.         : 7,922,094 B2
APPLICATION NO.    : 12/351590
DATED              : April 12, 2011
INVENTOR(S)        : Banerjee et al.

It is certified that error appears in the above-identified patent and that said Letters Patent is hereby corrected as shown below:

<u>Title Page 2, Column 2 (Other Publications)</u>
Line 5, delete "Kivikoshi," and insert -- Kivikoski, --, therefor.

<u>Column 3</u>
Line 57, delete "1 a" and insert -- 1a --, therefor.

<u>Column 6</u>
Line 44, delete "stop" and insert -- step --, therefor.

<u>Column 7</u>
Line 20, delete "integrated" and insert -- available integrated --, therefor.

Signed and Sealed this
Fourteenth Day of June, 2011

David J. Kappos
*Director of the United States Patent and Trademark Office*